(12) United States Patent
Lucas et al.

(10) Patent No.: US 9,806,991 B2
(45) Date of Patent: Oct. 31, 2017

(54) RENDERING NETWORK POLICY AND MONITORING COMPLIANCE

(71) Applicant: Cisco Technology, Inc., San Jose, CA (US)

(72) Inventors: Solomon T. Lucas, Sunnyvale, CA (US); Michael A. DeMoney, San Jose, CA (US); Christopher A. Wild, Erie, CO (US); Anand Oswal, Pleasanton, CA (US); Rong Wang, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 168 days.

(21) Appl. No.: 14/725,015

(22) Filed: May 29, 2015

(65) Prior Publication Data

US 2016/0211988 A1 Jul. 21, 2016

Related U.S. Application Data

(60) Provisional application No. 62/106,006, filed on Jan. 21, 2015.

(51) Int. Cl.
| | |
|---|---|
| *G06F 15/16* | (2006.01) |
| *H04L 12/707* | (2013.01) |
| *H04L 12/721* | (2013.01) |
| *H04L 12/725* | (2013.01) |
| *H04L 12/813* | (2013.01) |

(52) U.S. Cl.
CPC ............ *H04L 45/22* (2013.01); *H04L 45/302* (2013.01); *H04L 45/124* (2013.01); *H04L 45/306* (2013.01); *H04L 45/70* (2013.01); *H04L 47/20* (2013.01)

(58) Field of Classification Search
CPC ..... H04L 45/22; H04L 45/302; H04L 45/124; H04L 45/306; H04L 45/70
See application file for complete search history.

(56) References Cited

U.S. PATENT DOCUMENTS

| | | | |
|---|---|---|---|
| 6,789,118 B1 | 9/2004 | Rao | |
| 7,561,515 B2 * | 7/2009 | Ross | ................ H04L 47/22 370/229 |
| 8,131,992 B2 * | 3/2012 | Ennis, Jr. | ............ H04L 41/0853 370/254 |
| 8,146,160 B2 * | 3/2012 | Orr | ................... H04L 63/0209 713/168 |
| 8,923,853 B1 | 12/2014 | Shaw et al. | |
| 9,130,826 B2 * | 9/2015 | Nispel | .................. H04L 43/04 |
| 9,191,365 B2 * | 11/2015 | Orr | ................... H04L 63/0209 |
| 9,230,213 B2 * | 1/2016 | Rash | ........................ G06N 5/02 |

(Continued)

*Primary Examiner* — Moustafa M Meky
(74) *Attorney, Agent, or Firm* — Parker Ibrahim & Berg LLC; James M. Behmke; Kenneth J. Heywood

(57) ABSTRACT

In one embodiment, a network controller receives data indicative of one or more traffic requirements for network traffic. The network controller maps the data indicative of the one or more traffic requirements into a network policy. The network controller causes installation of the network policy onto one or more networking devices. The one or more networking devices are configured to route the network traffic based on the network policy. The network controller receives feedback regarding the installed network policy. The network controller adjusts the network policy based on the received feedback.

20 Claims, 8 Drawing Sheets

(56) References Cited

U.S. PATENT DOCUMENTS

| | | | |
|---|---|---|---|
| 9,455,923 B2* | 9/2016 | Mirza | H04L 47/20 |
| 2006/0072451 A1* | 4/2006 | Ross | H04L 47/10 |
| | | | 370/229 |
| 2009/0097418 A1* | 4/2009 | Castillo | H04L 41/12 |
| | | | 370/255 |
| 2009/0161551 A1 | 6/2009 | Danner | |
| 2010/0146037 A1 | 6/2010 | Little | |
| 2014/0280829 A1* | 9/2014 | Kjendal | H04L 43/028 |
| | | | 709/223 |
| 2014/0280889 A1* | 9/2014 | Nispel | H04L 43/04 |
| | | | 709/224 |
| 2014/0282823 A1* | 9/2014 | Rash | H04L 63/20 |
| | | | 726/1 |

* cited by examiner

RENDERING NETWORK POLICY AND MONITORING COMPLIANCE

RELATED APPLICATIONS

This application claims priority to U.S. Provisional Application No. 62/106,006 entitled, "MONITORING NETWORK POLICY COMPLIANCE," by Blair et al., and filed on Jan. 21, 2015, the contents of which are hereby incorporated by reference.

TECHNICAL FIELD

The present disclosure relates generally to computer networks, and, more particularly, to rendering a network policy and monitoring network policy compliance.

BACKGROUND

Enterprise networks are carrying a very fast growing volume of both business and non-business critical traffics. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

As the number of business and non-business critical applications increases, so too are the number and variety of service level agreements (SLAs) that may be in use by a network. In general, an SLA refers to a target or threshold level of performance guaranteed by the network, and may be associated with a particular type of traffic. For example, many real-time business applications are very bandwidth demanding and having corresponding SLAs that are used to ensure that a certain amount of network bandwidth is available for a particular flow of traffic.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a network controller receives data indicative of one or more traffic requirements for network traffic. The network controller maps the data indicative of the one or more traffic requirements into a network policy. The network controller causes installation of the network policy onto one or more networking devices. The one or more networking devices are configured to route the network traffic based on the network policy. The network controller receives feedback regarding the installed network policy. The network controller adjusts the network policy based on the received feedback.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1A:
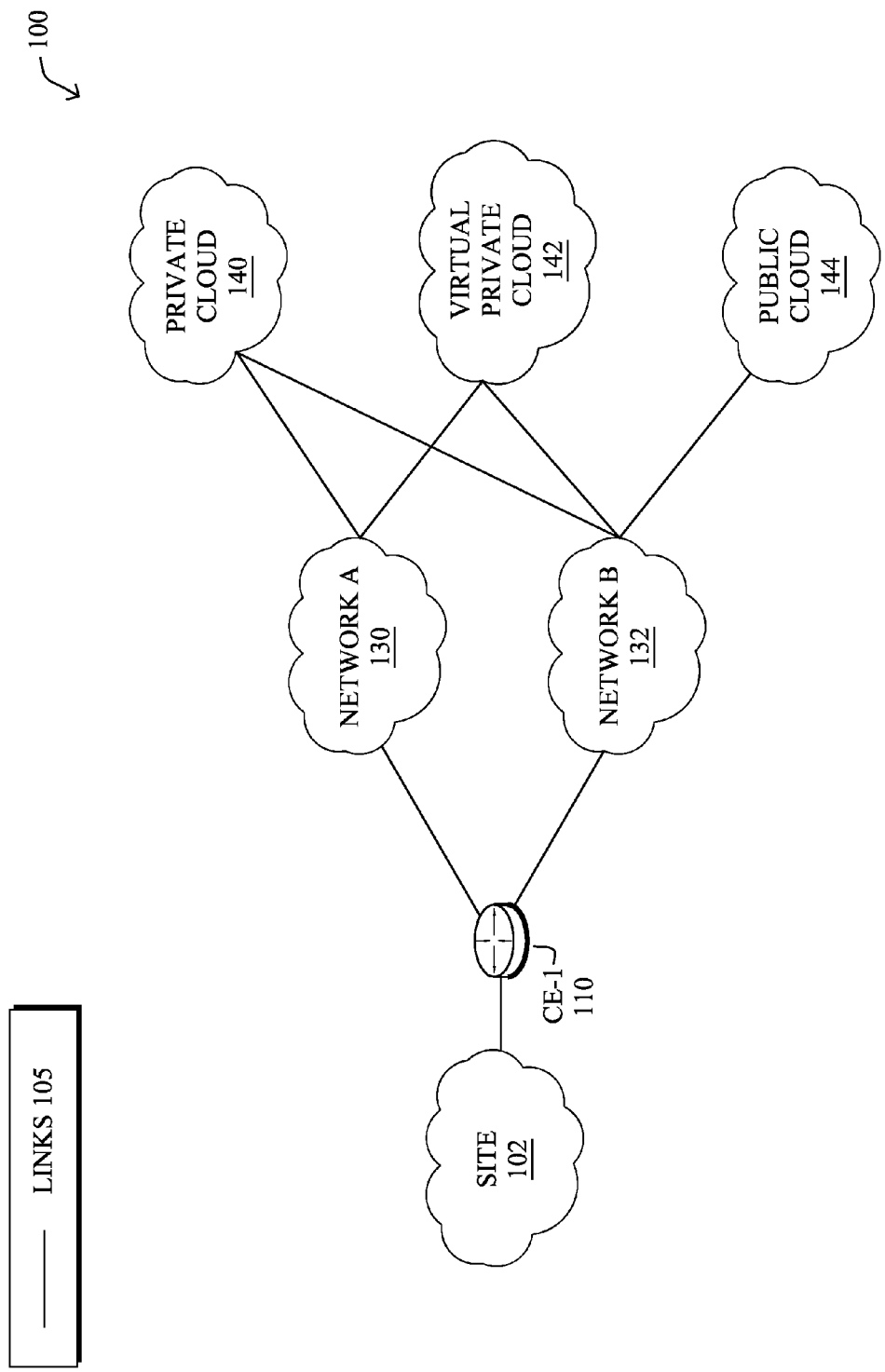
FIGS. 1A-1B illustrate an example communication system.

FIG. 1A is a schematic block diagram of an example communication system 100, according to various embodiments. As shown, a site 102 (e.g., a branch of an enterprise network, etc.) may connect the various computing devices located at site 102 (e.g., a LAN of devices) to various remote devices/services via one or more customer edge (CE) routers 110 and links 105. Such remote devices/services may exist within a private cloud 140, a virtual private cloud 142, a public cloud 144, or the like. In general, one or more CE routers 110 (e.g., router CE-1, etc.), may provide connectivity between devices on one or more LANs of site 102 with the devices/services associated with clouds 140-144. For example, public cloud 144 may include a publicly available web server, whereas private cloud 140 may include a server located within a data center operated by the same entity associated with site 102.

Data packets (e.g., traffic/messages) may be exchanged among the nodes/devices of the communication system 100 over links 105 using predefined network communication protocols such as TCP/IP, User Datagram Protocol (UDP), Asynchronous Transfer Mode (ATM) protocol, Frame Relay protocol, or any other suitable protocol. Those skilled in the art will understand that any number of nodes, devices, links, etc. may be used in the system, and that the view shown herein is for simplicity.

A particular site may be connected to clouds 140, 142, and/or 144 via any number of different core networks. For example, as shown, site 102 may be connected to a first network 130 and also to a second network 132, the links to which may exhibit very different network service level agreement (SLA) characteristics. Connections between site 102 and networks 130-132 may comprise, in various embodiments, public Internet connections, multiprotocol label switching (MPLS) networks, or the like. In one embodiment, networks 130, 132 may even be associated with different service providers.

For the sake of illustration, a given site may fall under any of the following categories:

1.) Site Type A: a site connected using a private or virtual private network (VPN) link via a single CE router and a single link, with potentially a backup link (e.g., a 3G/4G/LTE backup connection). For example, CE-1 shown may support site 102 via a link to network 130 (e.g., an MPLS network), potentially also with a backup network connection via a cellular wireless connection.

2.) Site Type B: a site connected using two VPN links (e.g., from different service providers), with potentially a backup link (e.g., a 3G/4G/LTE connection). In one example, dynamic tunneling techniques, such as Dynamic Multipoint Virtual Private Network (DMVPN) by Cisco Systems™ or the like, may be used to dynamically build VPN tunnels over one or more MPLS networks, one or more Internet connections, etc. A site of type B may itself be of different types:

2a.) Site Type B1: a site connected using two MPLS VPN links (e.g., from different service providers), with potentially a backup link (e.g., a 3G/4G/LTE connection). For example, networks 130 and 132 may be different MPLS networks, in one embodiment.

2b.) Site Type B2: a site connected to the network using one MPLS VPN link and one link connected to the public Internet, with potentially a backup link (e.g., a 3G/4G/LTE connection). For example, network 130 may be an MPLS network, whereas the connection to network 132 may be a public Internet connection, potentially also with a cellular wireless backup link.

2c.) Site Type B3: a site connected to the network using two links connected to the public Internet (e.g., via different service providers), with potentially one or more backup links (e.g., a 3G/4G/LTE connection). For example, the connections between CE-1 and both of networks 130, 132 may be public Internet connections via different service providers.

As would be appreciated, MPLS VPN links are usually tied to a committed SLA, whereas Internet links may either have no SLA at all or a loose SLA (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one network while a second CE router is connected to the other network), with potentially one or more backup links (e.g., a wireless 3G/4G/LTE backup link). For example, site 102 may include a first CE router 110 connected to network 130 and a second CE router 110 connected to network 132, in another embodiment.

As would be appreciated, any number of devices, configurations, and network connections may be used to provide remote communications to and from a given site. Further, while certain topologies are depicted, such as with a site connected to different service provider networks, other topologies may be used in other embodiments (e.g., site 102 may be connected to three different service provider networks, four different networks, etc.).

Figure 1B:
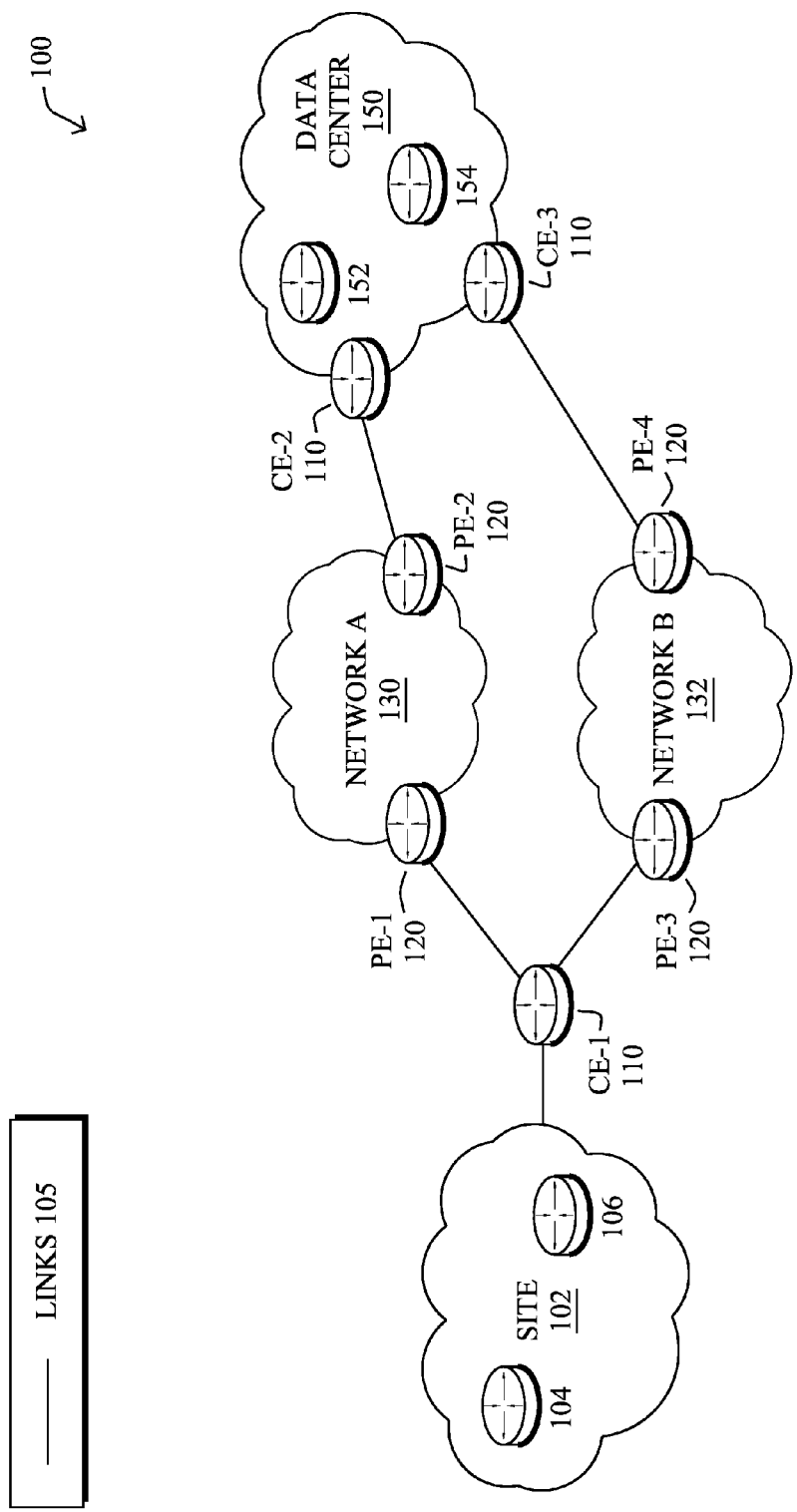

FIG. 1B illustrates an example of communication system 100 in greater detail, according to various embodiments. As shown, site 102 may be connected to a data center 150 via networks 130 and 132. For example, assume that branch 102 and data center 150 are associated with the same organization, e.g., as part of an enterprise network. Such an organization's network may include any number of local sites/branches that are serviced by data center 150 (e.g., as part of a hub-and-spoke configuration, etc.).

Data center 150 may include any number of servers, network controllers, or other devices that provide services to the devices associated with site 102. For example, as shown, data center 150 may include devices 152-154 that provide remote services to devices 104-106 and/or CE-1 located at site 102. In some embodiments, devices 152-154 may be part of a cloud environment that includes any number of different computing devices. Devices 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, communication system 100 may also include any number of local networks, data centers, cloud environments, devices/nodes, servers, etc.

As shown, CE router CE-1 may be connected to corresponding provider edge (PE) routers 120 for the different networks 130 and 132. Similarly, data center 150 may include one or more CE routers 110 (e.g., CE-2, CE-3) that are connected to corresponding PE routers in networks 130 and 132. As noted previously, in some cases, networks 130 and 132 may be networks maintained by different service providers and may be of the same or different type (e.g., MPLS, Internet, etc.).

Numerous types of application traffic may be flowing through current day networks. For example, a particular CE router 110 located at a customer site may provide and receive different forms of application traffic that is communicated through communication system 100. For example, traffic associated with a given customer site may include, but is not limited to, video data (e.g., video conferencing data), audio data (e.g., voice-over-IP (VoIP)), enterprise resource planning (ERP) data, customer relationship management (CRM) data, and the like. Each form of traffic may have specific network requirements and may be very demanding with respect to network availability and resiliency, such that even small deviations in network conditions may render an application incapable of providing the requisite experience to the end user. For example, low network performance may result in a video conference appearing choppy to the end users.

To ensure that certain degrees of performance are met for the network traffic, the various devices in system 100 (e.g., routers 110, 120, devices 152-154, etc.) may employ any or all of the following mechanisms:

Application Visibility and Control (AVC): this mechanism incorporates into the routing devices application recognition and performance monitoring capabilities traditionally available only as dedicated devices. For example, router CE-1 at site 102 shown may be configured to support AVC. In general, AVC allows application awareness to be built into the network infrastructure, plus visibility into the performance of applications running on the network. AVC also allows for enabling of per-application policy for granular control of application bandwidth usage. A typical AVC implementation may perform the following: application recognition, metrics collection and reporting, and management/control. For example, CE-1 may use the Network Based Application Recognition (NBAR) by Cisco Systems, Inc., or a similar mechanism (e.g., by using deep packet inspection, etc.), to associate traffic flows with specific applications. Collected performance metrics such as packet loss, bandwidth usage, etc., may be associated with the identified applications at the router and then reported to a supervisory device (e.g., one of devices 152-154, etc.), which may make any number of adjustments to the network, in response. The AVC mechanism may further operate in conjunction with a traffic flow analysis and reporting mechanism operable to distinguish between traffic flows and provide summarized reports to a supervisory device. An example of such a mechanism is NetFlow by Cisco Systems, Inc.

Performance Routing (PfR): this mechanism allows traffic to be automatically switched between multiple paths based on configured thresholds for network attributes such as delay, jitter, and loss. These attributes may be tracked using probes that are generated for each DSCP, source-destination tuple, etc. Also, these configured thresholds are based on the perceived tolerance of applications that are being sent over the network. Once these thresholds are crossed (e.g., if the delay increases from than 50 ms or the jitter increases by 5%), threshold crossing alerts may be sent out based on which the traffic is switched over to alternate and pre-configured paths. Once traffic has been moved, probes may continue to be sent out and after a pre-configured time period, based on the probe measurements, traffic is reverted to the original path. For example, assume that network 130 is an MPLS network and that network 132 provides an Internet connection to site 102. In such a case, CE-1 may use PfR to switch between communicating with data center 150 via networks 130 and 132, depending on the measured characteristics of the network and the policy-defined requirements for the specific network traffic.

These and other mechanisms may be used within a network such as communication system 100 to ensure that certain SLAs are met for a given application. For example, a supervisory APIC (e.g., one of devices 152-154, etc.) may operate as a policy engine that works in conjunction with the monitoring/reporting mechanisms local to the deployed routers, to ensure that traffic for a particular application experiences a desired level of performance.

Figure 2:
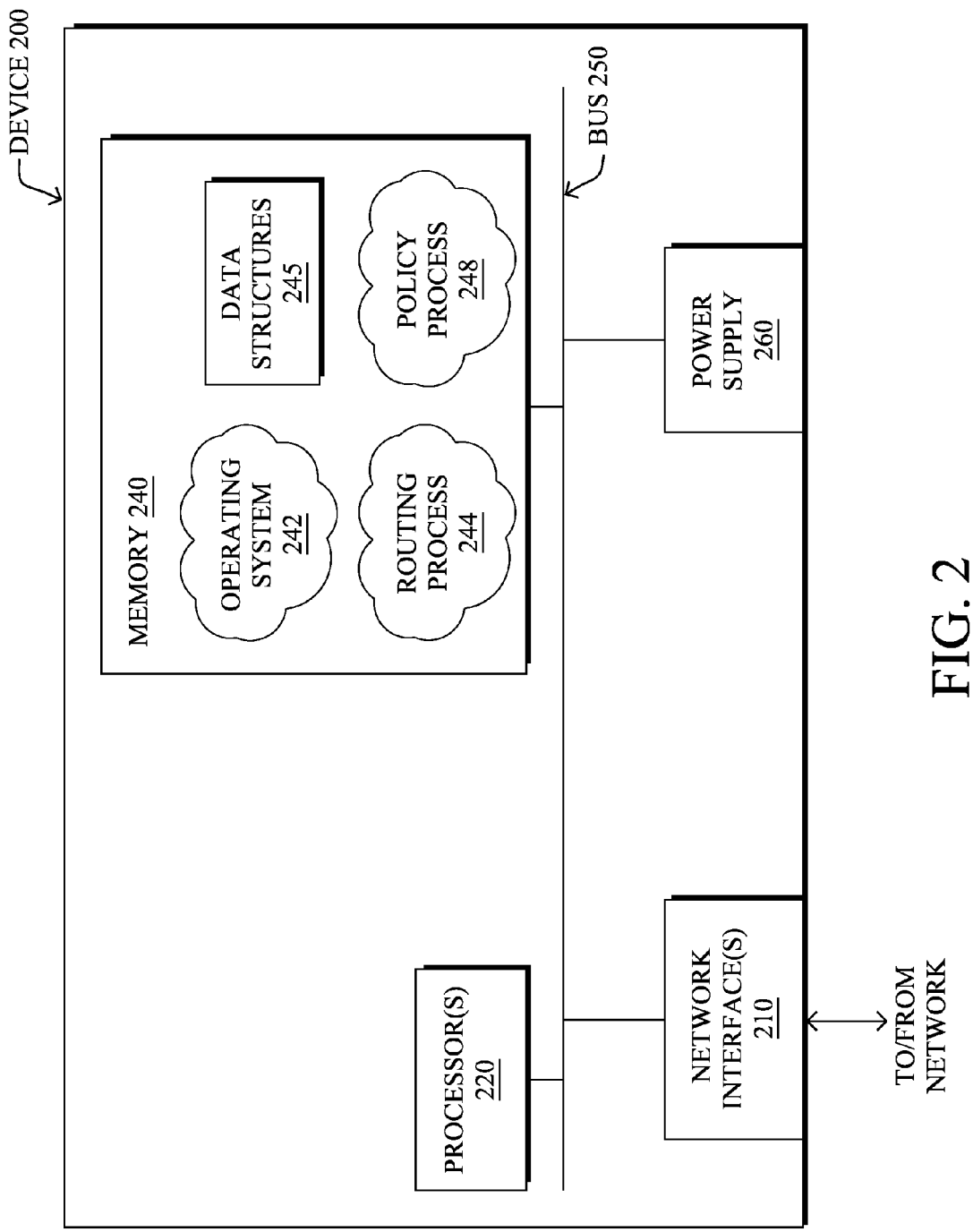
FIG. 2 illustrates an example network device/node.

FIG. 2 is a schematic block diagram of an example node/device 200 that may be used with one or more embodiments described herein, e.g., as any of the devices shown in FIGS. 1A-1B, particularly the CE routers 110, PE routers 120, and/or devices 104-106 and 152-154 (e.g., a network controller located in a data center, etc.), any other computing device that supports the operations of system 100 (e.g., switches, etc.), or any of the other devices referenced below. The device 200 may also be any other suitable type of device depending upon the type of network architecture in place. Device 200 generally comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the communication system 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a policy process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining a VRF instance, or tunneling protocols, such as for MPLS, generalized MPLS (GMPLS), etc., each as will be understood by those skilled in the art. In one embodiment, routing process 244 may be operable to establish dynamic VPN tunnels, such as by using a DMVPN overlay onto the network.

Routing process/services 244 may further be configured to perform additional functions such as security functions, firewall functions, AVC or similar functions, NBAR or similar functions, PfR or similar functions, combinations thereof, or the like. As would be appreciated, routing process/services 244 may be configured to perform any of its respective functions independently or in conjunction with one or more other devices. In other words, in some cases, device 200 may provide supervisory control over the operations of one or more other devices. In other cases, device 200 may be controlled in part by another device that provides supervisory control over the operations of device 200.

As noted above, customers (e.g., businesses, universities, individuals, etc.) may establish SLAs with their service providers, to ensure a certain degree of network performance. Typically, such SLAs are created based on the customer's intent (e.g., what applications that the customer is expecting to execute on the network), either as a provider or consumer. However, it may also be the case that a customer does not know precisely which performance parameters are important and/or their needed levels of performance. For example, while the customer may generally require "fast" connectivity, the customer may also not know which network parameters should be set (e.g., a minimum bandwidth, a maximum delay, a maximum jitter, a maximum packet drop rate, etc.) and/or the corresponding values (e.g., a 5 ms delay vs. a 100 ms delay, etc.).

In addition, rendering (e.g., translating, mapping, etc.) the customer's intent into network policies has generally been a manual process, which is both cumbersome and error-prone. Moreover, with the advent of more complex network architectures, such as multi-homing, tunneling, virtual service platforms (VSPs), etc., the task of rendering customer intent into computer network intent becomes even more critical. Furthermore, once these rendered policies are in place, whether manually implemented or dynamically created, it is difficult to determine whether the traffic cannot meet the policies because of network issues or because the policies were rendered due to customer-driven settings (e.g., too short a delay, too high a bandwidth, etc.).

Monitoring Network Policy Compliance

The techniques herein may be applied to networks whereby a customer's intent may be rendered (e.g., translated, mapped, etc.) into a network intent, such that a set of network policies may be dynamically established based on the network intent. In some aspects, two feedback loops are disclosed: a first loop that converts the customer's intent into a network intent and a second loop that converts the network intent into network operations/policies and ensures policy compliance. Further, the techniques herein may, proactively or reactively, adjust the resulting network policies, to ensure that the policies do, in fact, cause the network to meet the customer's intent.

Specifically, according to one or more embodiments of the disclosure as described in detail below, a network controller receives data indicative of one or more traffic requirements for network traffic. The network controller maps the data indicative of the one or more traffic requirements into a network policy. The network controller causes installation of the network policy onto one or more networking devices. The one or more networking devices are configured to route the network traffic based on the network policy. The network controller receives feedback regarding the installed network policy. The network controller adjusts the network policy based on the received feedback.

Illustratively, the techniques described herein may be performed by hardware, software, and/or firmware, such as in accordance with the policy process 248, which may include computer executable instructions executed by the processor 220 (or independent processor of interfaces 210) to perform functions relating to the techniques described herein, e.g., in conjunction with routing process 244. For example, the techniques herein may be treated as extensions to conventional protocols and as such, may be processed by similar components understood in the art that execute those protocols, accordingly.

Operationally, the techniques herein my generally be implemented by any central or distributed policy engine located within the computer network (e.g., one of devices 152-154 shown in FIG. 1B, distributed among routers 110 and/or 120, etc.). In one embodiment, and in accordance with the architecture described herein, an APIC controller may be used, which operates between the Applications and Network Infrastructure and abstracts the network infrastructure and provides higher level, intent-based policy interfaces to applications.

Figure 3:
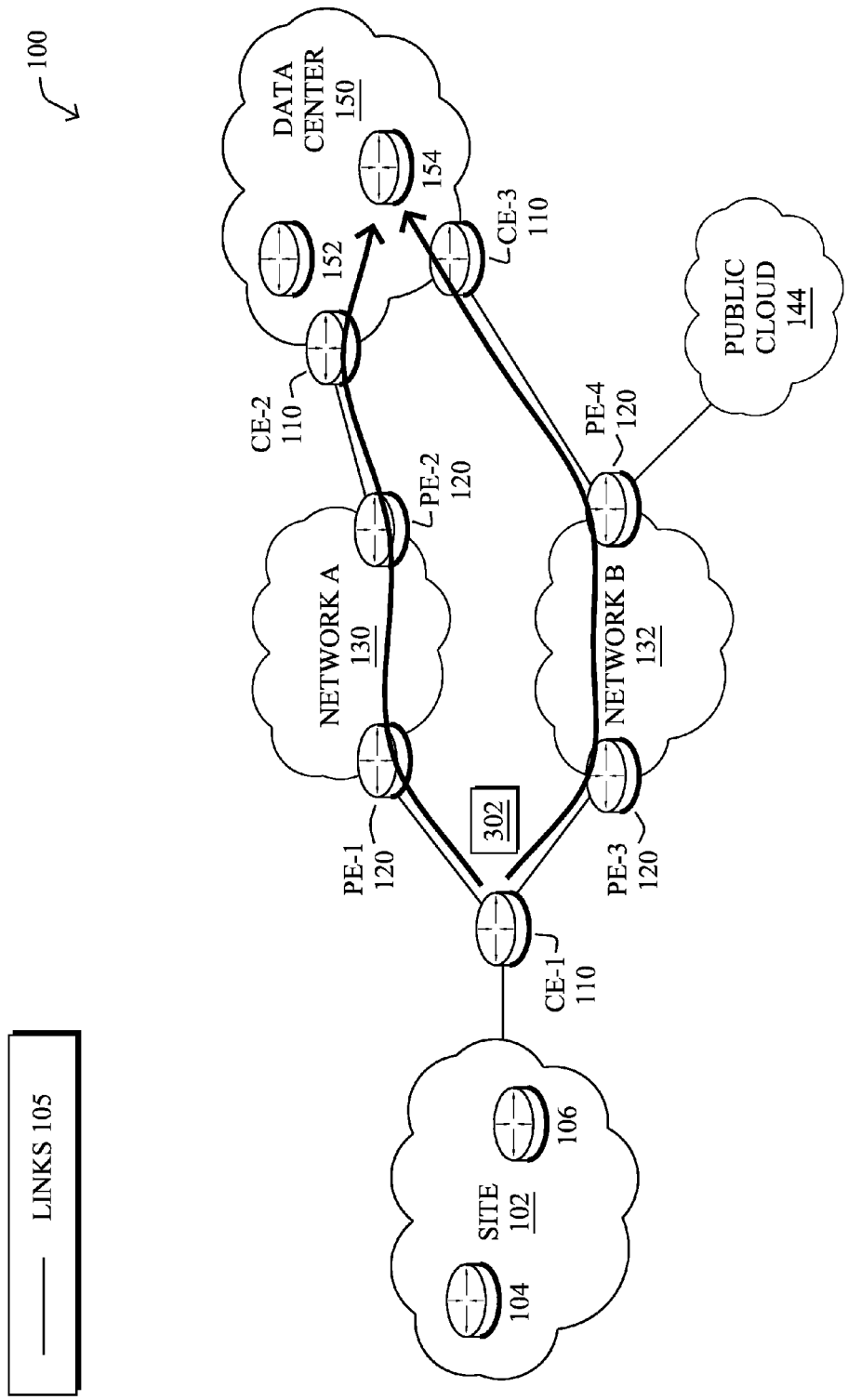
FIG. 3 illustrates an example of traffic being sent within a communication system.

Referring now to FIG. 3, an example of traffic being sent within communication system 100 is shown, according to various embodiments. As shown, assume that device 104 or 106 at site 102 is to communicate network traffic 302 with a particular device in data center 150 (e.g., device 154). Also as shown, assume that network 130 is an MPLS network and that network 132 is an Internet service provider's network that also allows devices 104 and 106 at site 102 to access other devices in public cloud 144 (e.g., public webservers, etc.). In some embodiments, CE router CE-1 may be configured to select between the use of network 130 and network 132 to communicate traffic 302 with device 154 in data center 150. For example, in some cases, CE-1 may establish VPN tunnels to data center 150 via either or both of both MPLS network 130 and via the Internet using network 132. In turn, CE-1 may send high priority traffic over the "premium" path via MPLS network 130 and may use network 132 to load balance any lower priority traffic via the Internet.

Figure 4A:
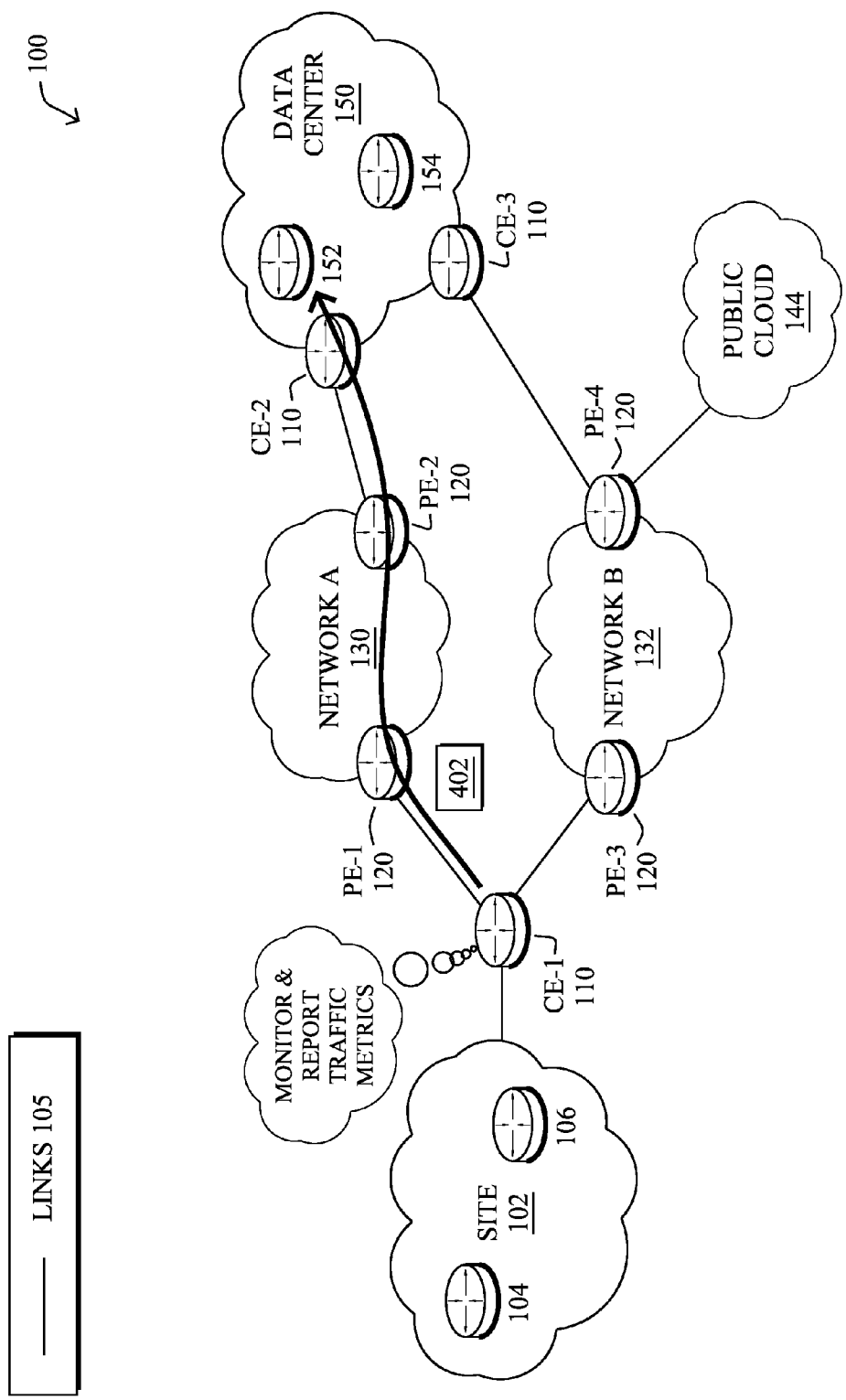
FIGS. 4A-4C illustrate examples of a network policy being installed or adjusted.
Figure 4B:
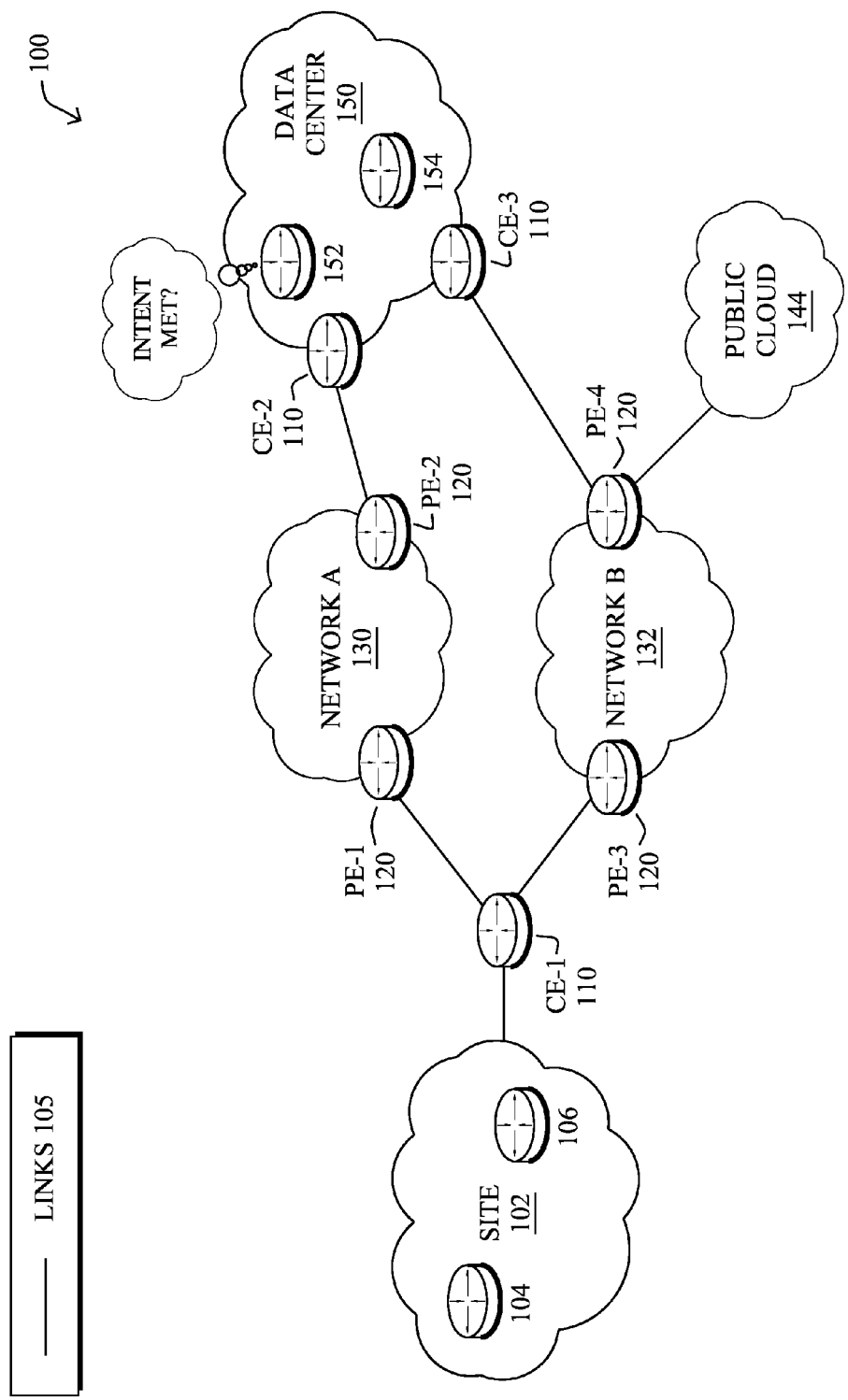
Figure 4C:
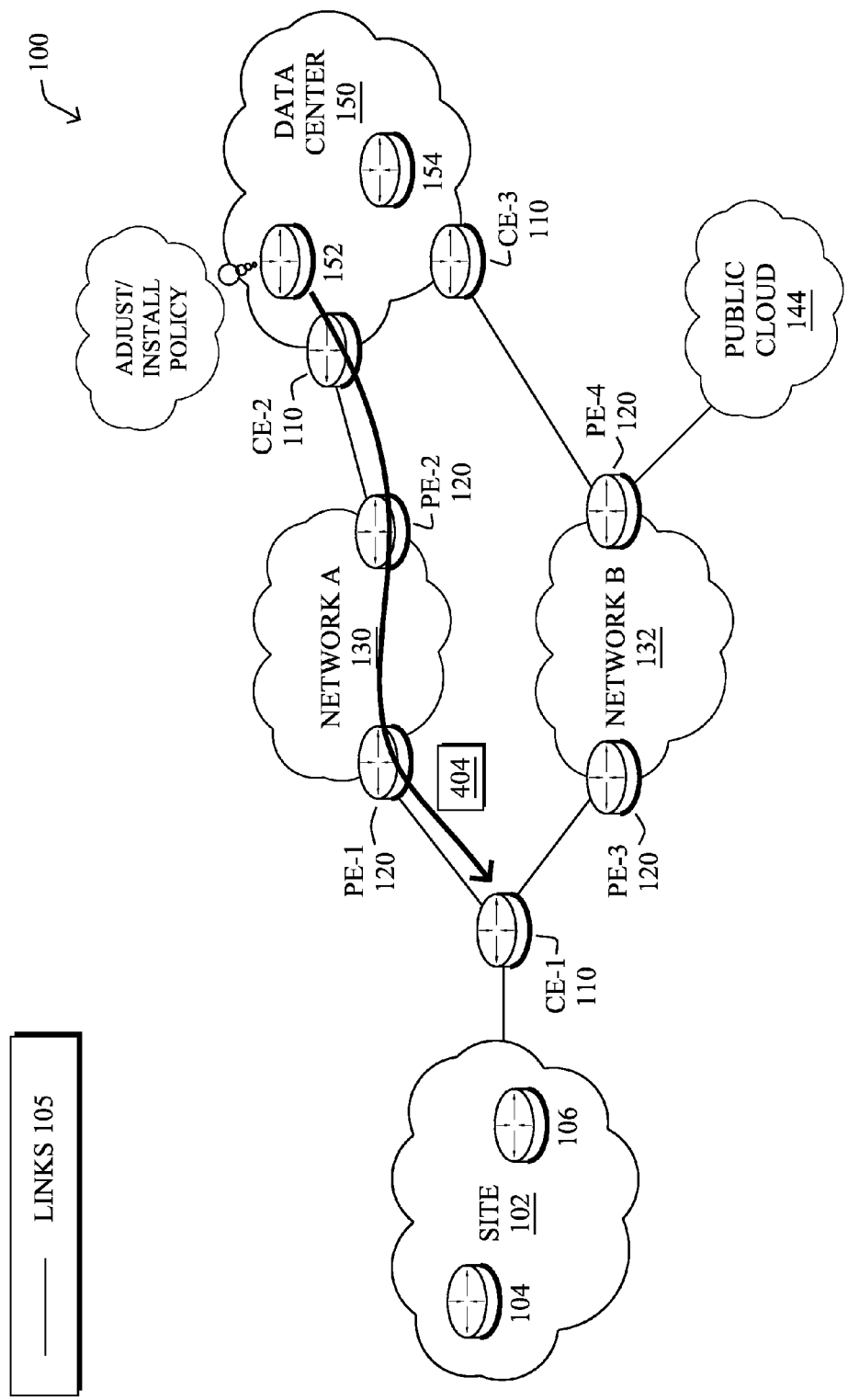

In various embodiments, as shown in FIGS. 4A-4C, CE router CE-1 (and any other CE routers, if used at site 102) may base routing decisions on one or more network policies. Such policies may generally control how router CE-1 routes traffic within communication system 100 (e.g., based on the type or application associated with the traffic, the class of traffic, the source of the traffic, the destination of the traffic, for a specific source-destination pair, etc.). For example, CE-1 may base its routing decisions on one or more Direct Internet Access (DIA) policies that control which traffic may be directed through a specific egress of the network that is connected to the Internet, rather than through a VPN. In one embodiment, in accordance with the illustrative architecture, due to the established policies, certain traffic may be forced through a head-end of a DMVPN tunnel or else direct to the public Internet, if allowed.

As noted previously, CE routers 110, PE routers 120, and/or any of the other computing devices in system 100 (e.g., the devices in data center 150, etc.) may be configured to monitor the performance of the various traffic flows within system 100. Notably, as shown in FIG. 4A, CE router CE-1 may monitor various traffic metrics and other properties of the traffic flowing through CE-1 and the corresponding links associated with CE-1. CE-1 may use such information to make routing decisions, e.g., based on one or more network policies installed on CE-1.

In some embodiments, CE-1 may be operable to provide network feedback 402 from its various monitoring and reporting mechanisms to a network controller (e.g., device 152, another APIC, another device, etc.). Such mechanisms may include, but are not limited to, flow monitoring/reporting mechanisms (e.g., Flexible NetFlow by Cisco Systems, Inc.), Simple Network Management Protocol (SNMP) mechanisms, AVC mechanisms, PfR events, quality of service (QoS) mechanisms, combinations thereof, or any other administrative mechanism used in the network.

In response to receiving network feedback, a network controller may determine whether the network performance for the traffic satisfies both the network intent (e.g., in terms of the actual thresholds/metrics used in the network) and the corresponding business intent of the customer. For example, as shown in FIG. 4B, device 152 may analyze network feedback 402 to determine whether the monitored traffic metrics, path selections, or other heuristics satisfy both the business intent of the customer and the corresponding rendered network intents. As used herein, business intent generally refers to a high level abstraction of customer requirements using a business-based policy lexicon and business-based building blocks. Similarly, network intent refers to a level of abstraction of the network that may be built using the various network mechanisms, network-derived knowledge, and/or customer input.

As shown in FIG. 4C, the network controller (e.g., device 152 configured as an APIC, another device, etc.) may cause the installation of one or more network policies 404 onto a CE router 110 and/or an adjustment of an already installed policy, according to various embodiments. In one embodiment, device 152 may generate/render a new network policy based on the business intent of a user (e.g., traffic requirements specified by a user via a user interface device). In turn, device 152 may cause the network policy to be installed at CE-1 by sending the new policy 404 to router CE-1. In another embodiment, assume that such a policy has already been installed onto router CE-1. Based on the feedback from the network and/or the user, device 152 may determine that the installed network policy should be adjusted and send the adjusted policy 404 to CE-1 for installation.

Figure 5:
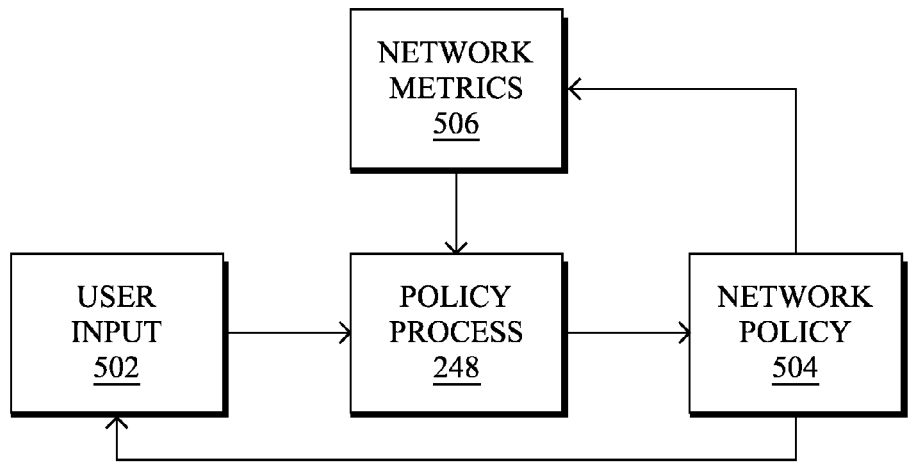
FIG. 5 illustrates an example architecture for generating a network policy and ensuring policy compliance.

Referring now to FIG. 5, an example architecture is illustrated for generating a network policy and ensuring policy compliance, according to various embodiments. As shown, the techniques herein may be used to implement two feedback loops: a first loop between the customer's intent (e.g., wishes) and the rendered network intent (e.g., policies) and a second loop between the network intent/policies and the actual network operations. Notably, the second feedback loop monitors the network operation for compliance with policies as mentioned above, and may return any granularity of results, ranging from simply indicating whether the monitored operations are in- or out-of-policy, a degree of policy compliance, specific reasons for non-compliance (e.g., a particular link is experiencing higher delays than normal), and so on. Using the second feedback loop, the policy engine (e.g., an APIC controller or other device executing policy process 248) may attempt to adjust the policies in a manner that still aligns with the customer intent (e.g., by re-rendering the customer's intent), but with a better understanding of the network operation. For example, new paths may be used, different protocols may be selected, certain limitations may be relaxed to allow more important limitations to be met, etc.

As shown, the device (e.g., an APIC, policy engine, etc.) executing policy process 248 may generate network policy 504 based on user input 502 received from a user interface device. In general, user input 502 may indicate one or more traffic requirements for traffic in the network. In various embodiments, user input 502 may be of a form that indicates a business intent regarding the traffic. As would be appreciated, one of the guiding principles of the techniques herein is to take the customer's static high level business intent and translate it into a network intent using, e.g., distributed knowledge of the network, input from the customer, etc. This network intent may then be used to form an actual network policy 504, which may then be applied to the network (e.g., by causing installation of policy 504 onto one or more devices in the network).

In various embodiments, user input 502 may include information such as business language expressions that convey the business intent for the network traffic. Example expressions may include, but are not limited to, "maintain experience," "priority path," "permit application," "deny application," "monitor application," "priority," "trust," or "scope." In other words, user input 502 may be of a higher level of abstraction than actual network parameters (e.g., specific traffic classes, jitter or bandwidth thresholds, etc.). For example, user input 502 may generally specify that a category of applications (e.g., video conferencing, etc.) is critical to the enterprise or is only to be given a best effort.

In some embodiments, user input 502 may be based in part on business-relevant information such as application categories (e.g., video, voice, etc.), private or public paths, virtual paths, user groups, geographic locations, regions, times of day, category relevance, role-based access control (RBAC), or the like. Further examples may include applications grouped per category, sites created based on groupings of devices that are co-located (e.g., by public IP geographical mapping, etc.), directly connected, have ping times under a certain threshold, grouped based on Link Layer Discovery Protocol (LLDP) information, using discovery protocol information, using DMVPN or similar information, route map analysis, device performance metrics, device capabilities, device locations in the network, or combinations thereof.

Policy process 248 may also render network policy 504 based in part on network metrics 506 regarding the operations and other conditions of the network itself. In other words, policy process 248 may map the business intent conveyed by user input 502 into network policy 504 based on measured information regarding the available paths and links in the network, the bandwidth available at each location in the network, etc. Notably, network metrics 506 may include data received from enterprise-wide servers, global service provider information, an enterprise IP address pool, specific routers in the network, or the like. For example, network metrics 506 may indicate the service provider SLAs, the link characteristics, existing network policies, the device characteristics, the application characteristics, QoS metrics, PfR measurements or other parameters, wide area application services, the network topology, access control lists (ACLs), or any other information regarding the state of the network. Example mechanisms that may be used to gather network metrics 506 may include, but are not limited to, AVC mechanisms (e.g., Netflow, etc.), PfR mechanisms, SNMP mechanisms, triggered network events, command line interface data, or the like.

As part of the mapping of user input 502 into network policy 504, policy process 248 may convert the business intent conveyed by user input 502 into a corresponding network intent on which network policy 504 may be based. In one embodiment, policy process 248 may use information from user input 502 and network metrics 506 regarding WAN link bandwidths, WAN path types, network locations, device capabilities, trust boundaries, service provider SLAs, application category relevance, call admission control, etc., to generate a QoS marking and queuing policy in network policy 504.

In another embodiment, policy process 248 may use information from user input 502 and network metrics 506 regarding device locations, the capabilities of the devices, derived geographical locations, regions, device performances, etc., to determine how a "business site" (e.g., a site from the perspective of the business) is translated into a set of network devices from the networking perspective.

In yet another embodiment, policy process 248 may use information from user input 502 and network metrics 506 regarding IP prefix mappings, category knowledge, category relevance, physical and/or virtual path availabilities, network locations, etc., to determine which applications are enterprise-based. In turn, policy process 248 may generate network policy 504 to control the traversal path used for the traffic based on performance and cost via path switch, load balancing, or plain routing, if the traffic is destined for the cloud.

In another embodiment, policy process 248 may use information from user input 502 and network metrics 506 regarding use category relevance, device capabilities, network locations, timing information, etc., to specify in network policy 506 which applications are to be used for performance metric generation and, consequently, induce a higher performance drain on the devices, as well as which applications are to be monitored for purposes of visibility only.

In a further embodiment, policy process 248 may use information from user input 502 and network metrics 506 regarding latency metrics in relation to one or more thresholds, device performance (e.g., CPU usages, etc.), etc., to generate an application policy in network policy 504 that adjusts certain application optimization requirements (e.g., to remove a specific application optimization when latency metrics exceed a certain threshold, add the optimization back based on the operations of the device, etc.).

As described previously, once network policy 504 has been generated, policy process 248 may cause network policy 504 to be installed onto one or more networking devices. For example, the device executing policy process 248 may cause network policy 504 to be installed onto a CE router or other networking device, to begin enforcing the policy and satisfy the business intent conveyed by user input 502.

In various embodiments, policy process 248 may employ a second control loop, to adjust network policy 504, once installed onto a networking device. In other words, once a policy is implemented in the network, the various mechanisms in the network (e.g., AVC, PfR, etc.) may be used to generate feedback from the network (e.g., network metrics 506), to determine how well the customer's business intent was met. If a delta exists between the network's observed performance and the customer's business intent, policy process 248, may dynamically adjust the network intent to generate and apply a new/adjusted network policy 504, in various embodiments. As noted, this may be performed in conjunction with a feedback mechanism whereby continuous monitoring of the network's performance may be used as feedback to determine whether any further deltas exist between the customer's intent and the network's performance. The network devices may further be operable to allow the customer to perform monitoring and troubleshooting by leveraging the same network feedback content.

In further embodiments, policy process 248 may use the monitored policy compliance information to confirm whether network policy 504 also satisfies the customer's intent (e.g., from user input 502) and/or to what degree. If the customer's intent is not satisfied (e.g., due to too great of a restraint, due to an unreasonable limitation, etc.), policy process 248 may provide a notification to the user (e.g., via a device associated with the customer/user). Such a notification may also include guidelines or other limitations via which an updated/adjusted intent may be defined. For example, if the customer's intent was "delay less than 100 ms," and there are no network paths available with that metric, then a generated report from policy process 248 may indicate the average minimum delays, and may prevent re-entry of a customer's intent less than those minimums.

In one example of operation, a device executing policy process 248 may trigger redirection of traffic via PfR to another WAN link, based on the dynamic feedback received from the network (e.g., network metrics 506). For example, assume that the feedback is indicative of a burst of packet drops reported for a cellular link and the supervisory device determines that the drops are not due to the corresponding device being on the move or traveling through a tunnel. The device may make such a determination by combining and analyzing monitored information collected from the cellular link, a monitored geo location of the device, reported cellular network conditions, or the like.

For a specific example, if an application belongs to a business critical category (e.g., its business intent is defined as business critical within user input 502), the corresponding network intent for the application's traffic may be defined as:
    set the PfR path to the best performing/dedicated path;
    set QoS parameters that give dedicated queues;
    set parameters that give caching and application optimizations; and
    set performance monitoring parameters (e.g., coarse grain vs. fine grain vs. sampling) that balance the associated performance hit with the criticality of the traffic.

In another example of operation, assume that user input 502 indicates that enterprise video is critical to the user's business and that traffic associated with the application "MyBusinessVideo" falls within such a category. In turn, policy process 248 may identify similar applications within the enterprise video category. For example, assume that the applications "Telepresence," "Jabber," and "Link" are also enterprise video applications. Policy process 248 may then relate traffic associated with "MyBusinessVideo" to traffic associated with the other enterprise video applications and generate network policy 504 to provide similar performance to traffic associated with "MyBusinessVideo" (e.g., by adding the application to the NBAR enterprise video category, by creating a priority queue for the application's traffic, by setting QoS parameters, etc.). In some cases, network policy 504 may also specify how the performance of traffic associated with "MyBusinessVideo" is monitored and reported. For example, network policy 504 may control how PfR mechanisms at the local router monitor and report on the performance of the application's traffic (e.g., by generating probes, etc.). Network policy 504 may also, in one embodiment, control whether the traffic associated with "MyBusinessVideo" can be offloaded onto a different link, so long as the performance remains acceptable. For example, network policy 504 may indicate that the video traffic may be sent via an Internet link to save on bandwidth costs, so long as the performance remains above a threshold level. If the performance is unacceptable, however, network policy 504 may specify that the traffic should be sent instead via an MPLS link.

In some embodiments, policy process 248 may use feedback from the user, to adjust an existing network policy. For example, assume that user input 502 indicates that the user is experiencing too much jitter for "MyBusinessVideo" to provide an acceptable experience. In response, policy process 248 may adjust network policy process 504 to force the traffic associated with the application to be sent via an MPLS link over that of an Internet link. In a further example, assume that user input 502 indicates that the video associated with "MyBusinessVideo" is experiencing drops. In such a case, policy process 248 may analyze network metrics 506, determine that the priority queue bandwidth for the application is too small, and adjust network policy 504 to increase the queue by 5%. In yet another example, if user input 502 indicates that the performance of "MyBusinessVideo" is acceptable after a temporary problem, policy process 248 may adjust network policy process 504 back to a baseline, after the problem is resolved.

Figure 6:
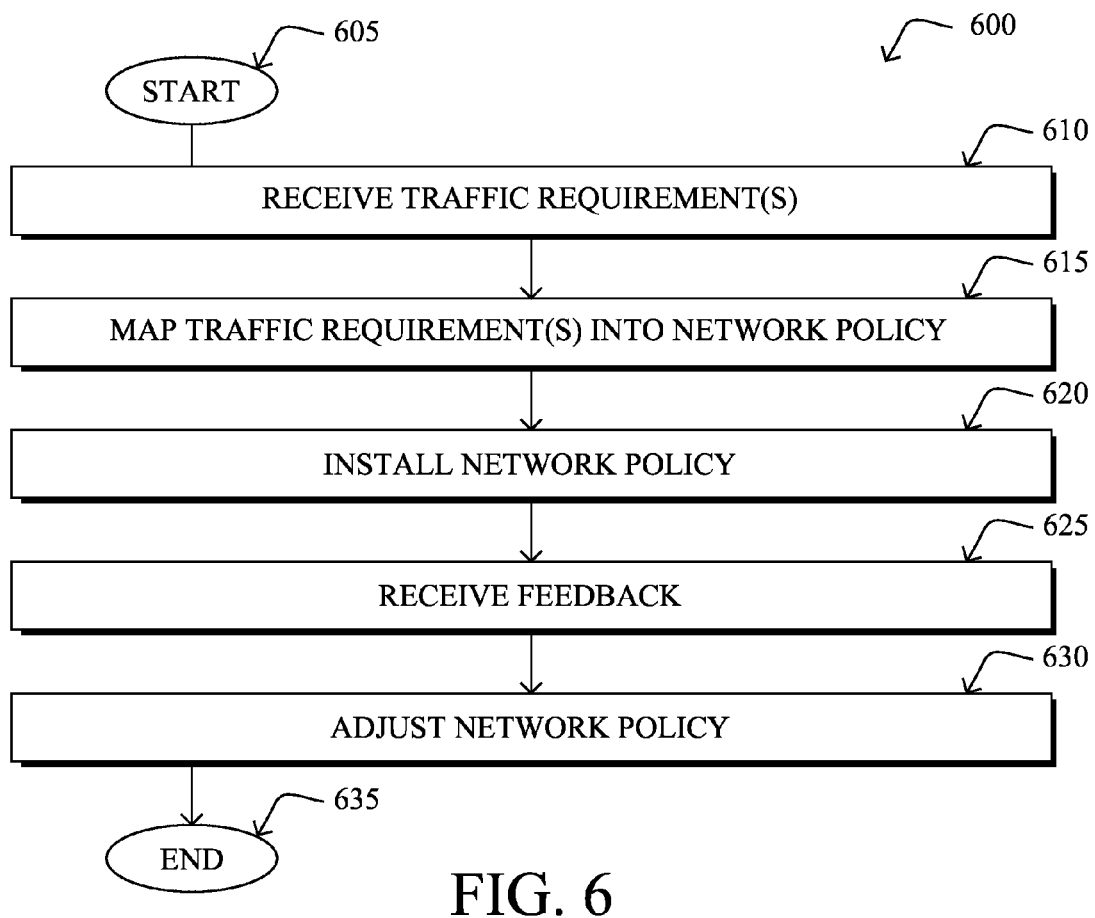
FIG. 6 illustrates an example simplified procedure for generating a network policy and ensuring network policy compliance.

Referring now to FIG. 6, an example simplified procedure is shown for generating a network policy and ensuring network policy compliance, according to various embodiments. In general, procedure 600 may be performed by a computing device in a network (e.g., device 200) that provides a degree of control over the network policies of the device itself and/or any other device in the network. In other words, the device may be a network controller that controls some or all of the operations of other devices in the network (e.g., CE routers, etc.). Procedure 600 may begin at step 605 and continue on to step 610 where, as described in greater detail above, the device/network controller may receive data indicative of one or more traffic requirements for network traffic. As noted previously, in some embodiments, the traffic requirements may be in a form that conveys a business intent, as opposed to actual parameters or metrics used within the network itself. For example, the traffic requirement may simply indicate that traffic associated with a particular application is critical to the enterprise, as opposed to actual requirements in terms of delay, jitter, bandwidth, etc.

At step 615, as detailed above, the controller may map the received traffic requirement(s) into a network policy. In other words, the controller may translate the non-technical traffic requirements received in step 610 into a set of one or more policy parameters that are configured to meet the indicated traffic requirement(s). For example, such a policy may indicate whether traffic associated with a particular application can be offloaded onto a different network connection (e.g., offloaded from an MPLS link onto an Internet link) or that the traffic must always be sent via a preferred connection (e.g., the MPLS link).

At step 620, the controller/device may cause the generated network policy to be installed onto one or more other devices, as detailed above. For example, if the controller/device is an APIC, the APIC may send the generated policy to one or more routers in the network, such as one or more CE routers associated with a particular site/branch. In response, the receiving device(s) may use the policy to control how certain network traffic is handled (e.g., in terms of security, routing decisions, etc.).

At step 625, the controller/device may receive feedback regarding the installed network policy, as described in greater detail above. In one embodiment, the feedback may be received from a user interface device. For example, user input data may indicate that a videoconferencing application keeps dropping off for the user and/or the degree of user satisfaction with how the traffic is being handled by the network. In another embodiment, the feedback may be received from one or more mechanisms implemented within the network to monitor and report on the state of the network. For example, the feedback may include information received from a PfR mechanism, AVC mechanism, etc.

At step 630, the controller/device may adjust the installed network policy based on the feedback received in step 625, as detailed above. In particular, the controller/device may adjust one or more parameters of the network policy and either provide a new network policy to the one more devices or provide an update to the installed policy on the devices. For example, assume that the feedback received in step 625 indicates that the jitter of videoconferencing traffic is above an acceptable limit. Also, assume that the installed network policy currently allows the video traffic to be offloaded onto an Internet connection instead of using an MPLS connection. In such a case, the controller/device may adjust the policy to cause the video traffic to be sent via the MPLS connection instead of via the Internet. Procedure 600 then ends at step 635.

It should be noted that while certain steps within procedure 600 may be optional as described above, the steps shown in FIG. 6 are merely examples for illustration and certain other steps may be included or excluded as desired. Further, while a particular order of the steps is shown, this ordering is merely illustrative, and any suitable arrangements of the steps may be utilized without departing from the scope of the embodiments herein.

The techniques described herein, therefore, provide for the rendering of a customer's intent into a network intent such that a layer of abstraction may be implemented to assist customers that do not know precisely how to configure or request specific SLA or other network parameters. Specifically, the techniques herein allow for feedback-based adjusting of rendered policies, ensuring that the customer's intent is properly managed within a computer network. In addition, the dynamic nature of the rendered policy adjustment removes the issues of manual operation, and is able to manage more complex network architectures.

While there have been shown and described illustrative embodiments that provide for establishing and ensuring network policy compliance, it is to be understood that various other adaptations and modifications may be made within the spirit and scope of the embodiments herein. For example, the embodiments have been shown and described herein with relation to certain network configurations. However, the embodiments in their broader sense are not as limited, and may, in fact, be used with other types of network configurations. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a network controller, data indicative of one or more traffic requirements for network traffic;
   mapping, by the network controller, the data indicative of the one or more traffic requirements into a network policy;
   causing, by the network controller, installation of the network policy onto one or more networking devices, wherein the one or more networking devices are configured to route the network traffic based on the network policy;
   receiving, at the network controller, feedback regarding the installed network policy; and
   adjusting, by the network controller, the network policy based on the received feedback.

2. The method as in claim 1, wherein mapping the data indicative of the one or more traffic requirements into the network policy comprises:
   identifying, by the network controller, a first application associated with the network traffic;
   identifying, by the network controller, a second application that is similar to the first application; and
   mapping, by the network controller, the one or more traffic requirements to a network policy associated with the second application.

3. The method as in claim 1, wherein the network policy causes the one or more network devices to send the network traffic via a first network connection to a first network, and wherein the adjusted network policy causes the one or more network devices to send the network traffic via a second network connection to a second network.

4. The method as in claim 3, wherein the first and second network connections comprise at least one of: a public wide area network (WAN) connection and a multiprotocol label switching (MPLS) network connection, two public WAN connections, or two MPLS network connections.

5. The method as in claim 3, wherein the first or second network connection comprises a cellular wireless connection.

6. The method as in claim 1, wherein the data indicative of the one or more traffic requirements for the network traffic is received from a user interface device and specifies a degree of importance for the network traffic.

7. The method as in claim 1, wherein the feedback is received from a user interface device and is indicative of a degree of user satisfaction.

8. The method as in claim 1, wherein the feedback comprises one or more metrics measured by the one or more network devices regarding the network traffic.

9. The method as in claim 1, further comprising:
   providing, by the network controller to a user interface device, an indication that the one or more traffic requirements for the network traffic are not achievable.

10. An apparatus, comprising:
    one or more network interfaces to communicate with a computer network;
    a processor coupled to the one or more network interfaces and configured to execute a process; and
    a memory configured to store the process executable by the processor, the process when executed operable to:
       receive data indicative of one or more traffic requirements for network traffic;
       map the data indicative of the one or more traffic requirements into a network policy;
       cause installation of the network policy onto one or more networking devices, wherein the one or more networking devices are configured to route the network traffic based on the network policy;
       receive feedback regarding the installed network policy; and
       adjust the network policy based on the received feedback.

11. The apparatus as in claim 10, wherein the apparatus maps the data indicative of the one or more traffic requirements into the network policy by:
   identifying a first application associated with the network traffic;
   identifying a second application that is similar to the first application; and
   mapping the one or more traffic requirements to a network policy associated with the second application.

12. The apparatus as in claim 10, wherein the network policy causes the one or more network devices to send the network traffic via a first network connection to a first network, and wherein the adjusted network policy causes the one or more network devices to send the network traffic via a second network connection to a second network.

13. The apparatus as in claim 12, wherein the first and second network connections comprise at least one of: a public wide area network (WAN) connection and a multiprotocol label switching (MPLS) network connection, two public WAN connections, or two MPLS network connections.

14. The apparatus as in claim 12, wherein the first or second network connection comprises a cellular wireless connection.

15. The apparatus as in claim 10, wherein the data indicative of the one or more traffic requirements for the network traffic is received from a user interface device and specifies a degree of importance for the network traffic.

16. The apparatus as in claim 10, wherein the feedback is received from a user interface device and is indicative of a degree of user satisfaction.

17. The apparatus as in claim 10, wherein the feedback comprises one or more metrics measured by the one or more network devices regarding the network traffic.

18. The apparatus as in claim 10, wherein the process when executed is further operable to:
   provide, to a user interface device, an indication that the one or more traffic requirements for the network traffic are not achievable.

19. A tangible, non-transitory, computer-readable media having software encoded thereon, the software when executed by a processor on a device in a computer network operable to:
   receive data indicative of one or more traffic requirements for network traffic;
   map the data indicative of the one or more traffic requirements into a network policy;
   cause installation of the network policy onto one or more networking devices, wherein the one or more networking devices are configured to route the network traffic based on the network policy;
   receive feedback regarding the installed network policy; and
   adjust the network policy based on the received feedback.

20. The computer-readable media as in claim 19, wherein the device maps the data indicative of the one or more traffic requirements into the network policy by:
   identifying a first application associated with the network traffic;
   identifying a second application that is similar to the first application; and
   mapping the one or more traffic requirements to a network policy associated with the second application.

* * * * *